(12) United States Patent
Yang et al.

(10) Patent No.: US 7,988,113 B2
(45) Date of Patent: Aug. 2, 2011

(54) DISPLAY DEVICE

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 254 days.

(21) Appl. No.: 12/494,231

(22) Filed: Jun. 29, 2009

(65) Prior Publication Data

US 2010/0051760 A1  Mar. 4, 2010

(30) Foreign Application Priority Data

Aug. 29, 2008  (CN) .......................... 2008 1 0304300

(51) Int. Cl.
*E04G 3/00* (2006.01)

(52) U.S. Cl. .................. 248/276.1; 248/284.1; 248/564; 248/919; 361/679.06

(58) Field of Classification Search .................. 248/564, 248/584, 370–371, 125.9, 291.1, 292.14, 248/917–923, 297.21, 130; 361/679.06, 361/679.27, 680–683
See application file for complete search history.

(56) References Cited

U.S. PATENT DOCUMENTS

| | | | |
|---|---|---|---|
| 6,532,147 B1 * | 3/2003 | Christ, Jr. ................ | 361/679.27 |
| 7,177,144 B2 * | 2/2007 | Ha et al. .................... | 361/679.06 |
| 7,395,996 B2 * | 7/2008 | Dittmer ...................... | 248/291.1 |
| 7,487,943 B1 * | 2/2009 | Gillespie ................... | 248/282.1 |
| 7,513,474 B2 * | 4/2009 | Anderson et al. .......... | 248/284.1 |
| 7,571,883 B2 * | 8/2009 | Van Groesen et al. ..... | 248/282.1 |
| 7,578,490 B2 * | 8/2009 | Kim ........................ | 248/281.11 |
| 7,648,112 B2 * | 1/2010 | Wu et al. .................... | 248/282.1 |
| 7,677,518 B2 * | 3/2010 | Chouinard et al. .......... | 248/370 |
| 7,690,605 B2 * | 4/2010 | Lee et al. ....................... | 248/133 |
| 2002/0033436 A1 * | 3/2002 | Peng et al. ................ | 248/284.1 |
| 2007/0210221 A1 * | 9/2007 | Kim et al. .................. | 248/124.1 |
| 2008/0078906 A1 * | 4/2008 | Hung ......................... | 248/276.1 |

* cited by examiner

*Primary Examiner* — Tan Le
(74) *Attorney, Agent, or Firm* — Clifford O. Chi

(57) ABSTRACT

A display device includes a seat, a support member, an adjusting member, and a display panel. The adjusting member is moveably attached to the rear of the display panel. The adjusting member includes a pair of first linkage poles, a pair of second linkage poles, a pair of third linkage poles, a fixing member, a first rotating shaft, a second rotating shaft, a third rotating shaft, and a fourth rotating shaft. The linkage poles and rotating shaft form a transmutable quadrilateral.

8 Claims, 4 Drawing Sheets

DISPLAY DEVICE

BACKGROUND

1. Technical Field

The disclosure relates to electronic devices, and especially, to a display device.

2. Description of Related Art

Ergonomics is a growing concern in both home and office environments. Therefore, there is a great demand for computer displays that can be easily adjusted for height and viewing angle.

BRIEF DESCRIPTION OF THE DRAWINGS

The components of the drawings are not necessarily drawn to scale, the emphasis instead being placed upon clearly illustrating the principles of a display device. Moreover, in the drawings, like reference numerals designate corresponding parts throughout several views.

DETAILED DESCRIPTION

Figure 1:
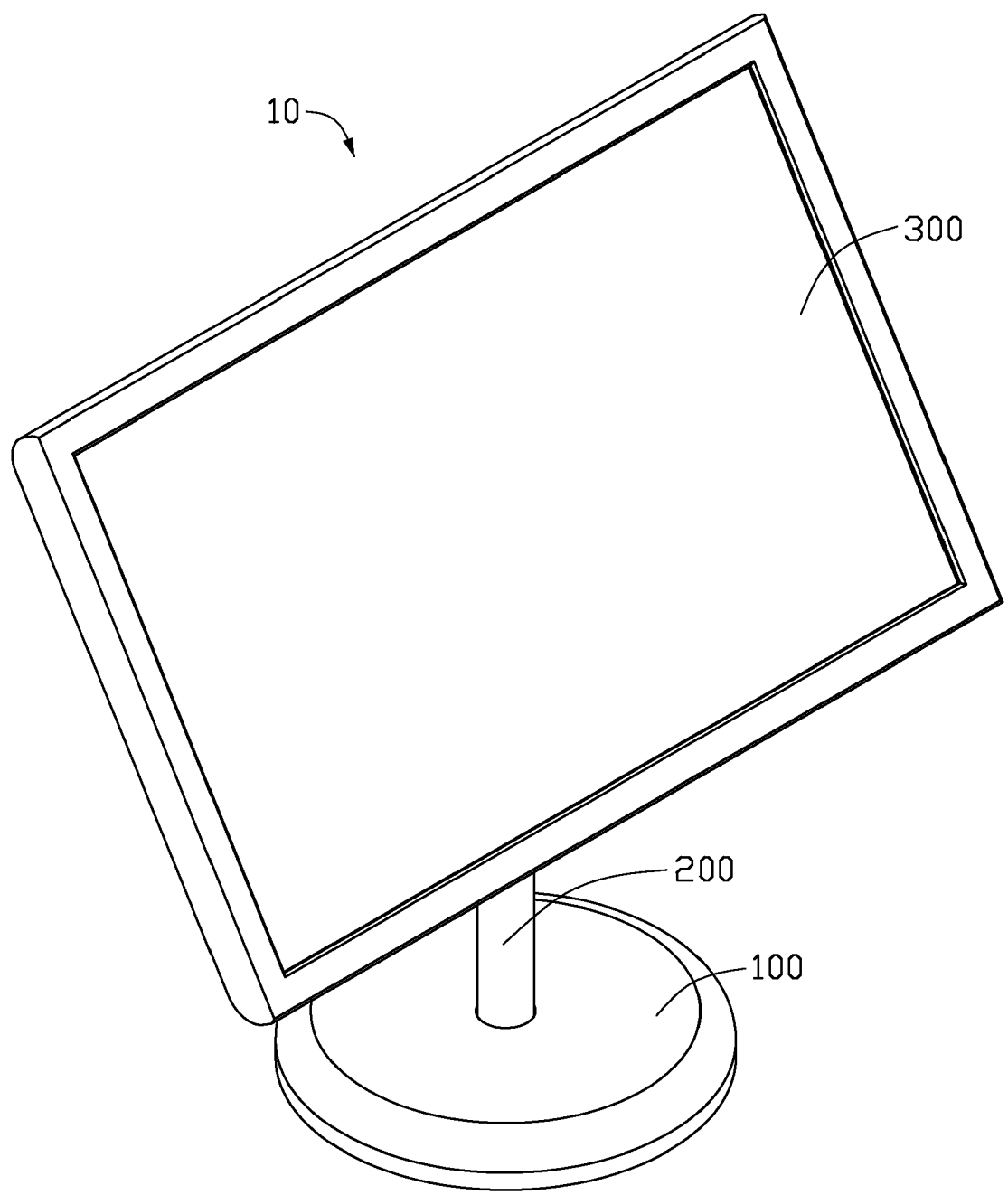
FIG. 1 is an isometric view of a display device in accordance with one embodiment, the display device including a fixing member and a display panel.
Figure 2:
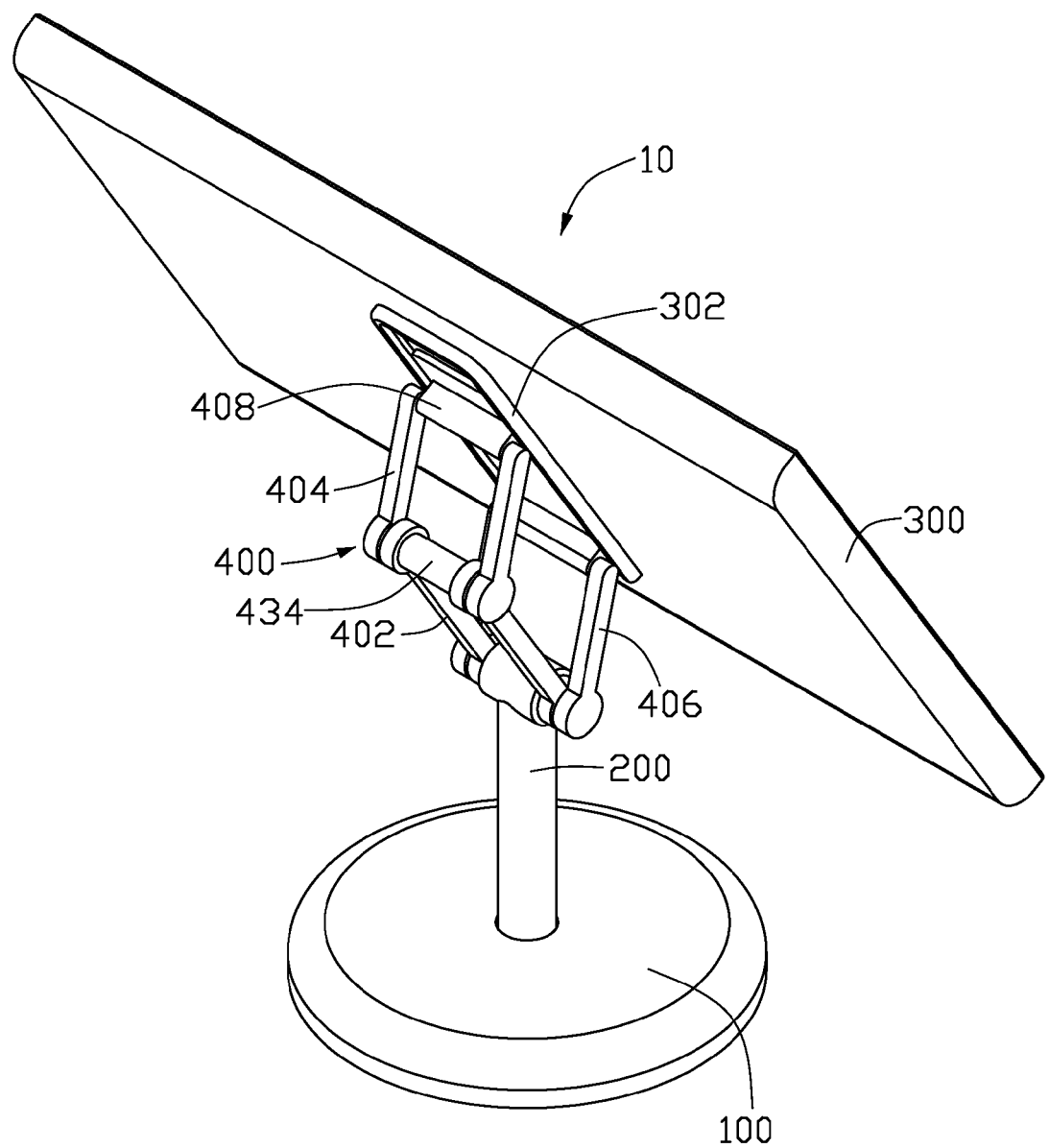
FIG. 2 is an isometric view of the display device of FIG. 1, viewed from another orientation.
Figure 3:
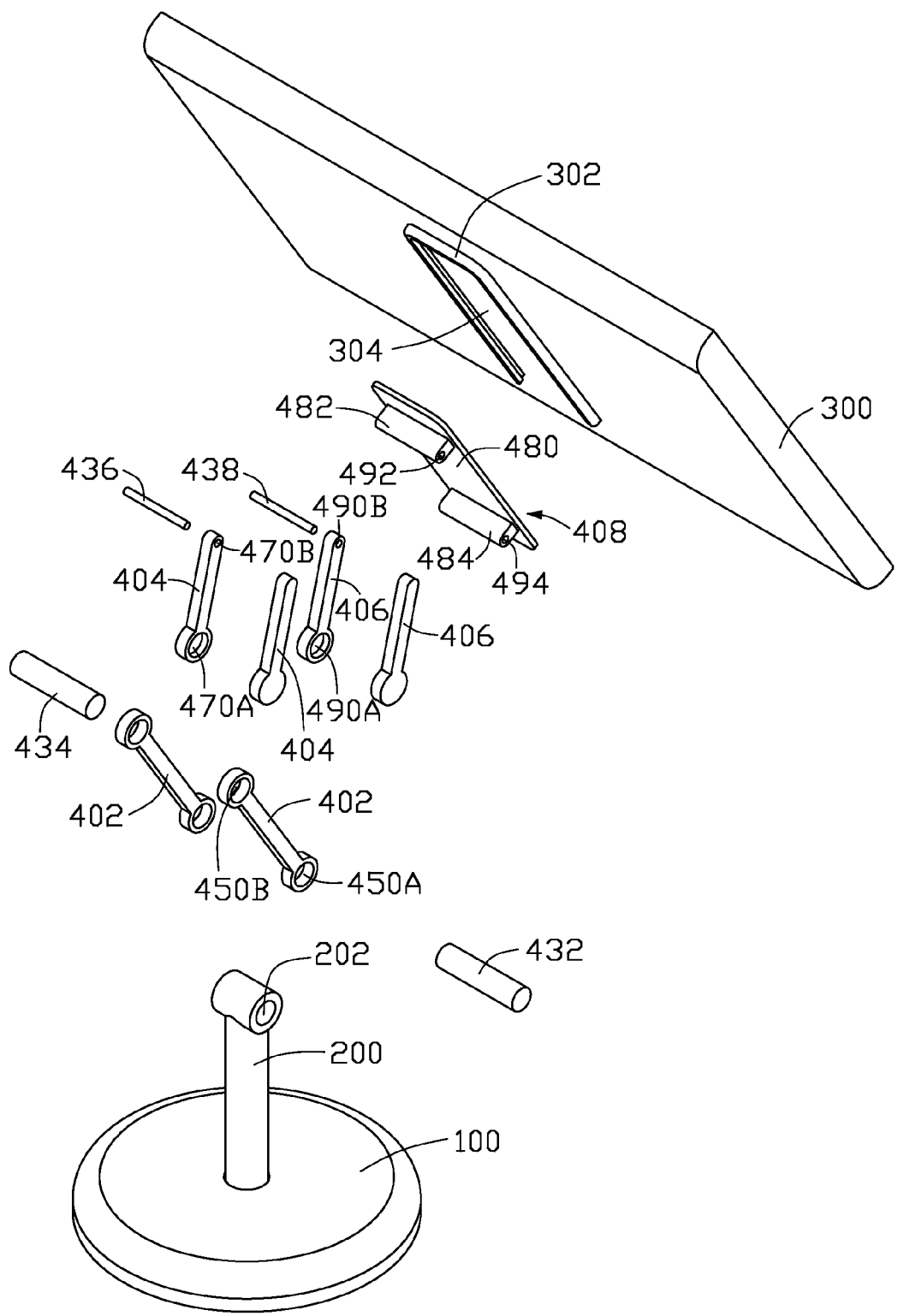
FIG. 3 is an exploded perspective view of the display device of FIG. 2.

Referring to FIGS. 1-3, a display device 10 includes a seat 100, a support member 200, a display panel 300, and an adjusting member 400.

The support member 200 may be generally cylindrical. One end of the support member 200 is attached to the seat 100. A first through hole 202 is defined at another end of the support member 200 and is used in attaching the support member 200 to the adjusting member 400. The hole 202 is formed with its axis generally perpendicular to the axis of the support member 200.

The adjusting member 400 includes a pair of first linkage poles 402, a pair of second linkage poles 404, a pair of third linkage poles 406, a fixing member 408, a first rotating shaft 432, a second rotating shaft 434, a third rotating shaft 436, and a fourth rotating shaft 438.

A second through hole 450A is defined at one end of each of the first linkage poles 402, and a third through hole 450B is defined at another end of each of the first linkage poles 402. A first blind hole 470A is defined at one end of each of the second linkage poles 404, and a second blind hole 470B is defined at another end of each of the second linkage poles 404. A third blind hole 490A is defined at one end of each of the third linkage poles 406, and a fourth blind hole 490B is defined at another end of each of the third linkage poles 406.

The fixing member 408 includes a thin base portion 480. The base portion 480 includes a first projection portion 482 and a second projection portion 484 formed thereon. The projection portions 482 and 484 are spaced from each other. A fourth through hole 492 and a fifth through hole 494 are formed along the width of the projection portions 482 and 484, and are formed with their axes generally parallel to the base portion 480. In the embodiment as shown in FIG. 3, the base portion 480 is generally rectangular and can be movably attached to the rear of the panel 300.

The third rotating shaft 436 passes through the fourth through hole 492, and the fourth rotating shaft 438 passes through the fifth through hole 494. The second linkage poles 404 are pivotably attached to the third rotating shaft 436 by placing the third blind holes 470B over the two opposite ends of the third rotating shaft 436. Similarly, the third linkage poles 406 are pivotably attached to the fourth rotating shaft 438 by placing the fourth blind holes 490B over the two opposite ends of the fourth rotating shaft 438. The first rotating shaft 432 passes through the first through hole 202. The first linkage poles 402 are pivotably attached to the first rotating shaft 432 by placing the second through holes 450A over the first rotating shaft 432, and the second through holes 450A located adjacent to two opposite sidewalls of the support member 200. The first linkage poles 402 are pivotably attached to the second rotating shaft 434 by placing the third through holes 450B over the second rotating shaft 434. The third linkage poles 406 are pivotably attached to the first rotating shaft 432 by placing the third blind holes 490A over the two opposite ends of the first rotating shaft 432. Similarly, the second linkage poles 404 are pivotably attached to the second rotating shaft 434. After assembling, the fixing member 408, the first linkage poles 402, the second linkage poles 404, the third linkage poles 406, and the fixing member 408 form a transmutable quadrilateral.

Figure 4:
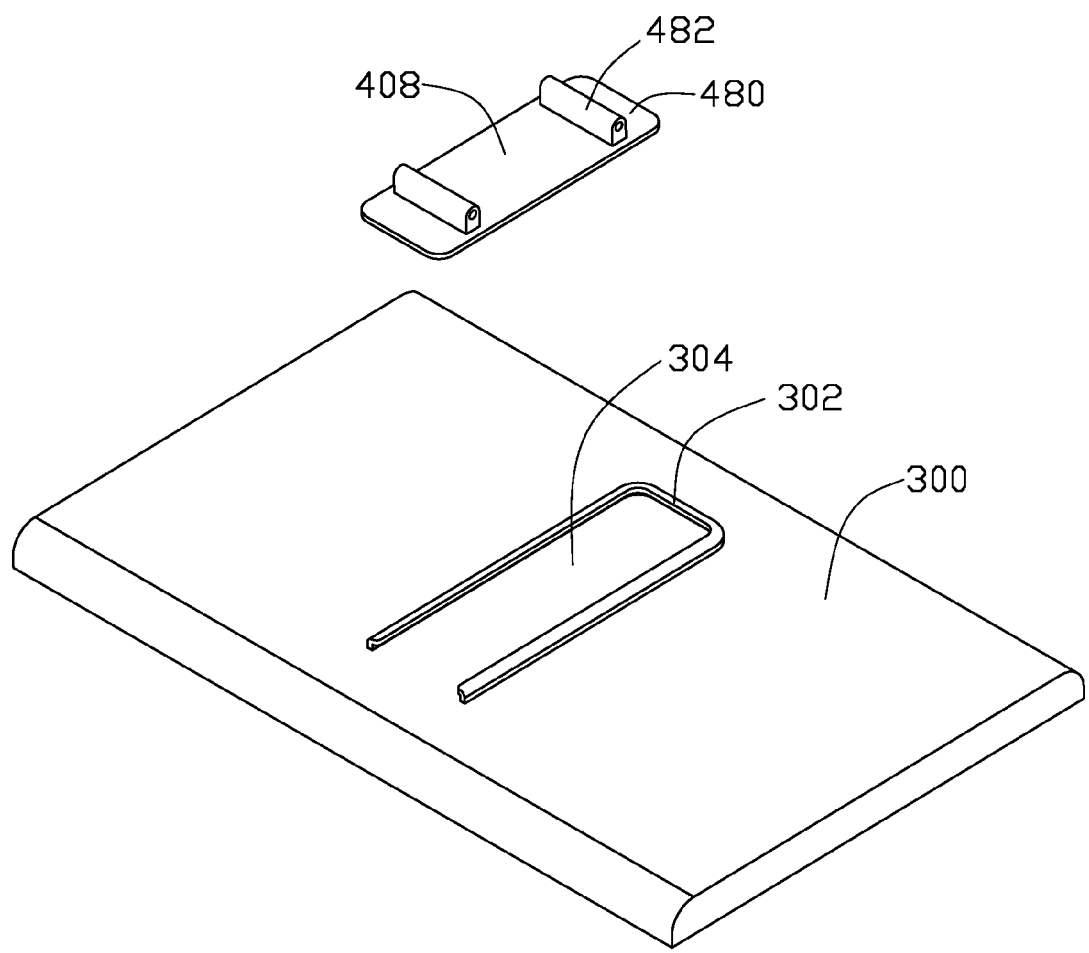
FIG. 4 is a perspective view of the fixing member and the display panel of the display device of FIG. 1.

Referring to FIG. 4, a rail 302 is formed on the rear side of the panel 300. The rail 302 includes a receiving space 304. The base portion 480 can be received in the receiving space 304 and can be moved along the rail 302. The fixing member 408 is thus moveably attached to the rear of the panel 300 via the sliding engagement of the base portion 480 and the rail 302.

After assembly, the panel 300 is moveably attached to the adjusting member 400 and the adjusting member 400 is pivotably attached to the support member 200. Because the adjusting member 400 is pivotably attached to the support member 200, the panel 300 can be rotated to a desired angle. Because the panel 300 is movably attached to the adjusting member 400, after the panel 300 is adjusted to the desired angle, users can further adjust the height of the panel 300 by moving the panel 300 up or down.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A display device comprising:
    a seat;
    a support member;
    a display panel; and
    an adjusting member comprising a pair of first linkage poles, a pair of second linkage poles, a pair of third linkage poles, a fixing member moveably attached to the rear of the display panel, a first rotating shaft, a second rotating shaft, a third rotating shaft, and a fourth rotating shaft, wherein one end of each of the first linkage poles and the third linkage poles are pivotably attached to the supporting member via the first rotating shaft, and another end of each of the first linkage poles is pivotably attached to one end of each of the second linkage poles via the second rotating shaft; another end of each of the second linkage poles is pivotably attached to the fixing member via the third rotating shaft; another end of each of the third linkage poles is pivotably attached to the fixing member via the fourth rotating shaft.

2. The display device as described in claim 1, wherein the fixing member comprises a base portion; two projection portions are formed on the base portion; a through hole is formed along a width of each of the projection portions, the base portion is moveably attached to the rear of the display panel; the third rotating shaft is received in one of the through holes of the projection portions and the fourth rotating shaft is received in the other through hole of the projection portions.

3. The display device as described in claim 2, wherein the projection portions are spaced from each other; the axes of the through holes of the projection portions are formed generally parallel to the base portion.

4. The display device as described in claim 2, wherein a rail is formed on a rear side of the display panel, the rail comprising a receiving space for receiving the base portion; the base portion is moveable along the rail.

5. The display device as described in claim 1, wherein a through hole is defined at one end of the support member, the through hole of the support member is formed with its axis generally perpendicular to the axis of the support member; the first rotating shaft passes through the through hole.

6. The display device as described in claim 1, wherein two through holes are defined at two ends of each of the first linkage poles; the first linkage poles are pivotably attached to the first rotating shaft and the second rotating shaft by placing the through holes of the first linkage poles over the first rotating shaft and the second rotating shaft.

7. The display device as described in claim 1, wherein two blind holes are defined at two ends of each of the second linkage poles; the second linkage poles are pivotably attached to the second rotating shaft and the third rotating shaft by placing the blind holes over the ends of the second rotating shaft and the third rotating shaft.

8. The display device as described in claim 1, wherein two blind holes are defined at two ends of each of the third linkage poles; the third linkage poles are pivotably attached to the first rotating shaft and the fourth rotating shaft by placing the blind holes over the ends of the first rotating shaft and the fourth rotating shaft.

* * * * *